(12) United States Patent
Ji

(10) Patent No.: US 9,686,345 B2
(45) Date of Patent: Jun. 20, 2017

(54) DEVICE MANAGEMENT METHOD AND APPARATUS

(71) Applicant: ZTE Corporation, Shenzhen, Guangdong (CN)

(72) Inventor: Dong Ji, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 159 days.

(21) Appl. No.: 14/434,235

(22) PCT Filed: Jun. 20, 2013

(86) PCT No.: PCT/CN2013/077604
§ 371 (c)(1),
(2) Date: Apr. 8, 2015

(87) PCT Pub. No.: WO2013/170801
PCT Pub. Date: Nov. 21, 2013

(65) Prior Publication Data
US 2015/0264108 A1 Sep. 17, 2015

(30) Foreign Application Priority Data

Oct. 10, 2012 (CN) .......................... 2012 1 0382209

(51) Int. Cl.
*H04L 29/08* (2006.01)
*H04W 4/02* (2009.01)
*G06F 17/30* (2006.01)

(52) U.S. Cl.
CPC ........ *H04L 67/04* (2013.01); *G06F 17/30899* (2013.01); *H04L 67/34* (2013.01); *H04W 4/02* (2013.01)

(58) Field of Classification Search
CPC ................. H04W 4/02; G06F 17/3089; G06F 17/30165; H04L 67/02; H04L 41/0886; H04L 67/04; H04L 67/34
(Continued)

(56) References Cited

U.S. PATENT DOCUMENTS 8,635,313 B2 * 1/2014 Larsen ................ H04L 41/0846
709/221
2006/0039561 A1 * 2/2006 Ypya ................... H04L 41/0253
380/270
(Continued)

FOREIGN PATENT DOCUMENTS

CN 101222721 A 7/2008
CN 101436195 A 5/2009
(Continued)

OTHER PUBLICATIONS

International Search Report in international application No. PCT/CN2013/077604, mailed on Sep. 26, 2013.
(Continued)

*Primary Examiner* — Ruolei Zong
(74) *Attorney, Agent, or Firm* — Oppedahl Patent Law Firm LLC

(57) ABSTRACT

A device management method and apparatus are described. The method includes the following steps: a terminal detects an access of a device (S102); and the terminal generates a WEB User Interface (WEB UI) corresponding to the device according to a configuration file corresponding to the device (S104). According to the disclosure, the problem of incompatibility of the WEB UI of the terminal with multiple devices is solved, and the WEB UI of the terminal can be adapted to the multiple devices.

10 Claims, 3 Drawing Sheets

(58) Field of Classification Search
USPC .......................................................... 709/219
See application file for complete search history.

(56) References Cited

U.S. PATENT DOCUMENTS

| | | | |
|---|---|---|---|
| 2007/0093243 A1* | 4/2007 | Kapadekar | H04M 3/42178 455/419 |
| 2008/0065753 A1* | 3/2008 | Rao | H04L 12/2602 709/223 |
| 2008/0281956 A1* | 11/2008 | Madej | H04L 41/0226 709/223 |
| 2009/0300137 A1* | 12/2009 | Tyhurst | H04L 67/34 709/217 |
| 2009/0319649 A1 | 12/2009 | Larsen | |
| 2009/0320098 A1* | 12/2009 | Roberts | H04L 12/2818 726/3 |
| 2010/0180204 A1 | 7/2010 | Mathur | |
| 2010/0180294 A1* | 7/2010 | Yun | H04H 20/59 725/33 |
| 2010/0188676 A1 | 7/2010 | Ohashi | |
| 2014/0108629 A1 | 4/2014 | Larsen et al. | |

FOREIGN PATENT DOCUMENTS

| | | |
|---|---|---|
| CN | 101895582 A | 11/2010 |
| CN | 102385523 A | 3/2012 |
| CN | 102929835 A | 2/2013 |
| EP | 2214096 | 8/2010 |

OTHER PUBLICATIONS

English Translation of the Written Opinion of the International Search Authority in international application No. PCT/CN2013/077604, mailed on Sep. 26, 2013.
Supplementary European Search Report in European application No. 13791357.0, mailed on Nov. 10, 2015.

* cited by examiner

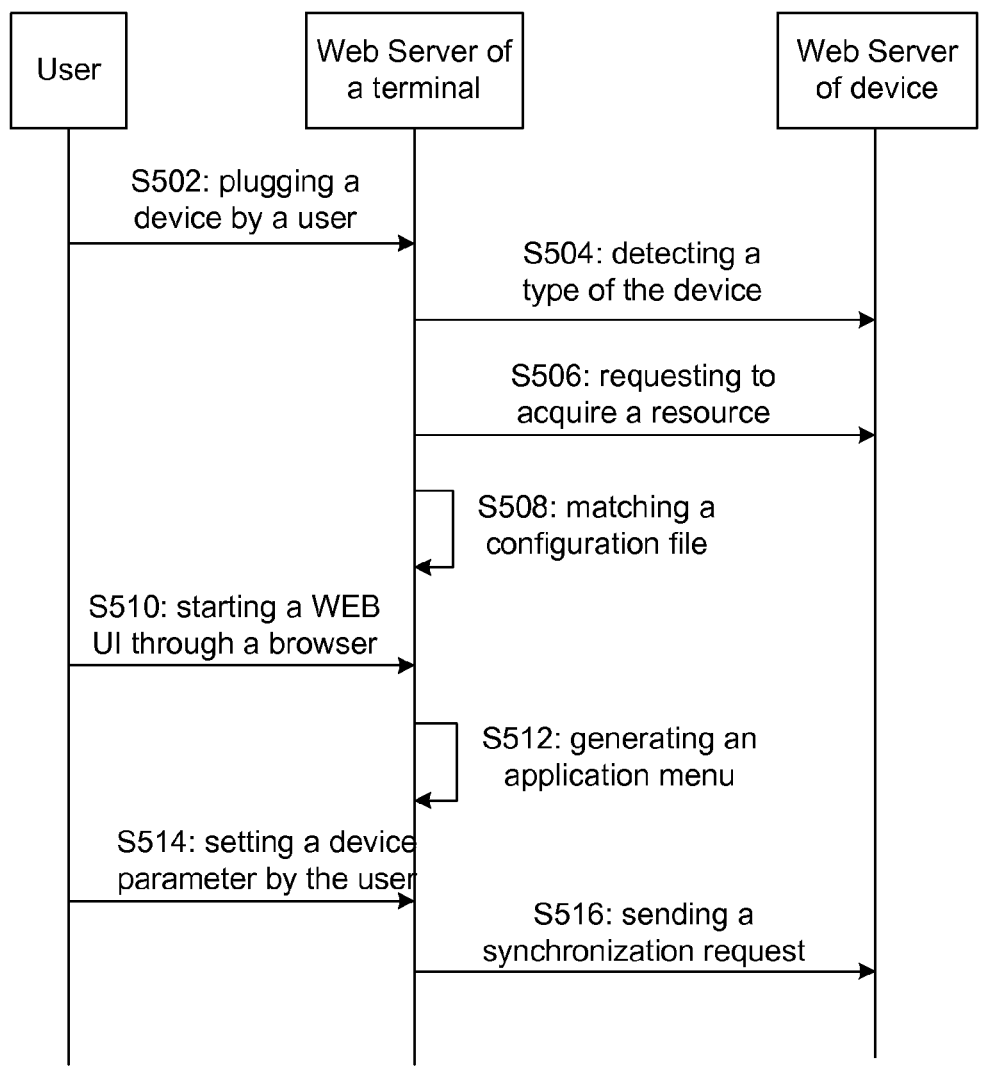

DEVICE MANAGEMENT METHOD AND APPARATUS

TECHNICAL FIELD

The disclosure relates to the field of communications, in particular to a device management method and apparatus.

BACKGROUND

At present, the field of communications progresses with each passing day, the use of a mobile terminal is gradually popularized, and different types of device emerge one after another, such as a functional mobile phone, a smart mobile phone, a tablet Personal Computer (PC) and data cards of various systems. Therefore, when a client uses a terminal device, a user interface management module on a terminal side is required to realize interaction between the device and the terminal side, such as functions of data synchronization, data backup, more convenient operation over the device on the terminal and the like.

The user interface management module on the terminal side in the related art is mainly divided into two: a Personal Computer User Interface (PC UI) and a WEB User Interface (WEB UI). The WEB UI tends to gradually take the place of the PC UI by virtue of easiness in development and flexibility, but it has the shortcoming of applicability to single device only. If the user has multiple devices, PC UI management software is required to be installed for many times respectively. Although the WEB UI exists in the device, and is not required to be installed, WEB UIs in different devices are greatly different in style and operating mode, so that the WEB UI is unfavourable for the use of the user. For a research and development person, it is necessary to maintain multiple versions of the two user interface management modules, which causes workload increase and reusability degradation.

For the problem of applicability of the WEB UI of the terminal to single device only in the related art, there is yet no effective solution.

SUMMARY

The disclosure provides a device management method and apparatus, so as to solve the problem of incompatibility of a WEB UI of a terminal with multiple devices.

A device management method includes:

detecting, by a terminal, an access of a device; and generating, by the terminal, a user device management application WEB User Interface (WEB UI) corresponding to the device according to a configuration file corresponding to the device.

Wherein, the terminal generating the user device management application WEB UI corresponding to the device according to the configuration file corresponding to the device may include:

downloading a resource supporting the device from the device under the condition that the WEB UI of the terminal does not support the device;

searching, by the terminal, the resource for the configuration file corresponding to the device; and generating, by the terminal, the WEB UI corresponding to the device according to the configuration file.

Wherein, the terminal generating the user device management application WEB UI corresponding to the device according to the configuration file corresponding to the device may include:

searching an existing resource of the terminal for the configuration file corresponding to the device under the condition that the WEB UI of the terminal supports the device; and generating, by the terminal, the WEB UI corresponding to the device according to the configuration file.

Wherein the downloading the resource supporting the device from the device may include:

sending, by the terminal, an acquiring resource request to the device; and receiving, by the terminal, the resource sent in response to the request by the device, and storing the resource in its Web Server.

Wherein, the method may further include: after the terminal generates the user device management application WEB UI corresponding to the device according to the configuration file corresponding to the device, when a user sets a parameter of the device in the WEB UI of the terminal, sending, by the terminal, a synchronization request to the device to notify the device to set the corresponding parameter.

Wherein, the method may further include: after the terminal generates the user device management application WEB UI corresponding to the device according to the configuration file corresponding to the device, dynamically loading, by the terminal, a required resource on a page and a logic processing part according to an operation of a user and the configuration file, and generating a corresponding page menu.

A device management apparatus includes:

a detection module, configured to detect an access of a device; and a generation module, configured to generate a user device management application WEB User Interface (WEB UI) corresponding to the device according to a configuration file corresponding to the device.

Wherein, the apparatus may further include:

a downloading module, configured to download a resource supporting the device from the device under the condition that the WEB UI of a terminal does not support the device; and a searching module, configured to search the resource for the configuration file corresponding to the device.

Wherein, the searching module may be further configured to search an existing resource of the terminal for the configuration file corresponding to the device under the condition that the WEB UI of the terminal supports the device.

Wherein, the apparatus may further include: a receiving and sending module, configured to send an acquiring resource request to the device, and to store a resource in its Web Server when receiving the resource sent in response to the request by the device.

According to the disclosure, the terminal generates the user device management application WEB UI corresponding to the device according to the configuration file corresponding to the device after detecting the access of the device, so that the problem of incompatibility of the WEB UI of the terminal with WEB UIs of multiple devices is solved, and the effect that the terminal can be adapted to the WEB UIs of the multiple devices is further achieved.

BRIEF DESCRIPTION OF THE DRAWINGS

FIG. 5 is a third flowchart of a device management method according to a preferred embodiment of the disclosure.

DETAILED DESCRIPTION

The disclosure is described below with reference to the drawings and embodiments in detail. It should be noted that the embodiments of the disclosure and the characteristics in the embodiments can be combined under the condition of no conflicts.

Embodiment 1

Figure 1:
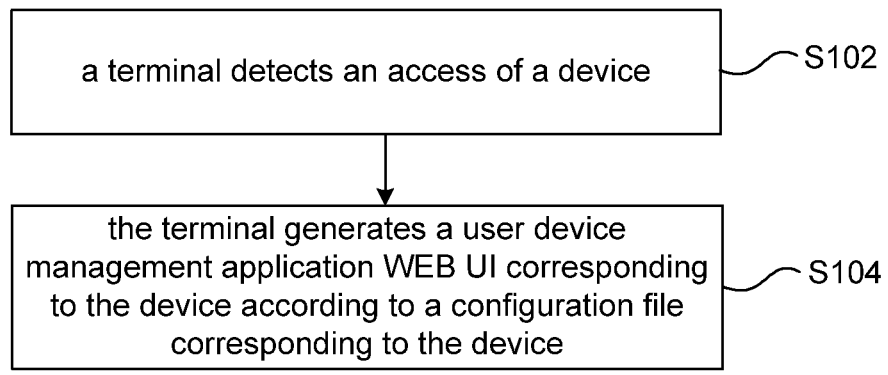
FIG. 1 is a flowchart of a device management method according to an embodiment of the disclosure.

The embodiment of the disclosure provides a device management method, FIG. 1 is a flowchart of a device management method according to an embodiment of the disclosure, and as shown in FIG. 1, the method includes the following steps:

Step 102: a terminal detects an access of a device; and

Step 104: the terminal generates a user device management application WEB UI corresponding to the device according to a configuration file corresponding to the device.

By the steps, the condition that a PC UI is required to be installed for many times respectively or each device employs its own WEB UI when a user has multiple devices in the related art is changed, the problem of incompatibility of the WEB UI of the terminal with the WEB UIs of the multiple devices is further solved, and the beneficial effect that the terminal can be adapted to the WEB UIs of the multiple devices is achieved.

There are many manners for acquiring the configuration file corresponding to the device, and the following two manners are preferred:

manner 1: a resource supporting the device is downloaded from the device under the condition that the WEB UI of the terminal does not support the device, and the terminal searches the downloaded resource for the configuration file corresponding to the device, and further generates the WEB UI corresponding to the device according to the configuration file; and manner 2: the terminal searches an existing resource of the terminal for the configuration file corresponding to the device under the condition that the WEB UI of the terminal supports the device, and further generates the WEB UI corresponding to the device according to the configuration file.

By the steps, the terminal can rapidly and accurately obtain a related resource of the device and further rapidly find the configuration file corresponding to the device from the resource.

There are also many manners for downloading the related resource of the device from a device side by the terminal, and preferably, the terminal can send an acquiring resource request to the device, and stores the received resource in its Web Server under the condition that the terminal receives the resource sent in response to the request by the device. By the steps, the terminal stores the related resource in the Web Server for the WEB UI to use.

If a user sets a certain parameter of the device through the WEB UI of the terminal, the terminal can send a synchronization request to the device to notify the device to set the corresponding parameter. By the step, device parameter synchronization between a terminal side and the device side can be implemented.

If the user operates the WEB UI of the terminal, a required resource on a page and a logic processing part can be dynamically loaded according to the operation of the user and the configuration file of the device, and a corresponding page menu can be generated. By the steps, the page can be dynamically loaded, and the effect of compatibility of the WEB UI of the terminal with the WEB UIs of the multiple devices is further achieved.

Embodiment 2

The embodiment of the disclosure also provides a device management apparatus, which is configured to implement the abovementioned embodiment and preferred implementation modes, and what has been described will not be repeated. For example, a term "module", used below, is a combination of software and/or hardware for realizing preset functions. The apparatus described in the following embodiment is preferably implemented by software, but the implementation of the apparatus with hardware or the combination of software and hardware is also possible and conceived.

Figure 2:
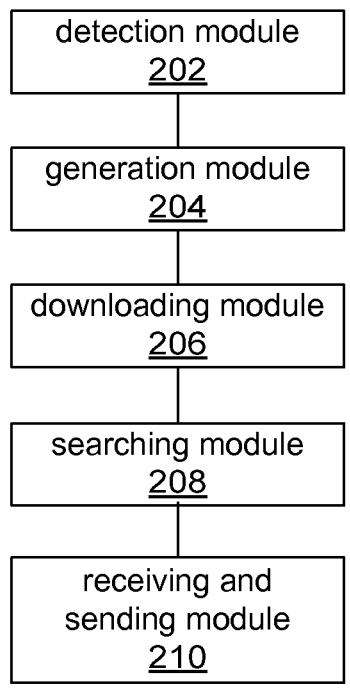
FIG. 2 is a structure diagram of a device management apparatus according to an embodiment of the disclosure.

FIG. 2 is a structure diagram of a device management apparatus according to an embodiment of the disclosure, and as shown in FIG. 2, the apparatus includes: a detection module 202 and a generation module 204.

The detection module 202 is configured to detect an access of a device; and the generation module 204 is configured to generate a user device management application WEB UI corresponding to the device according to a configuration file corresponding to the device.

Preferably, the apparatus further includes: a downloading module 206, which is configured to download a resource supporting the device from the device under the condition that the WEB UI of a terminal does not support the device; and a searching module 208, which is configured to search the resource for the configuration file corresponding to the device.

Preferably, the searching module 208 is further configured to search an existing resource of the terminal for the configuration file corresponding to the device under the condition that the WEB UI of the terminal supports the device.

Preferably, the apparatus further includes: a receiving and sending module 210, which is configured to send an acquiring resource request to the device, and when receiving the resource sent in response to the request by the device, to store the resource in its Web Server.

In a preferred implementation mode of the embodiment of the disclosure, each part in the apparatus can be combined to realize a corresponding function and achieve the same beneficial effect according to the method according to embodiment 1, and the embodiment of the disclosure will not be specifically repeated here.

Embodiment 3

Figure 3:
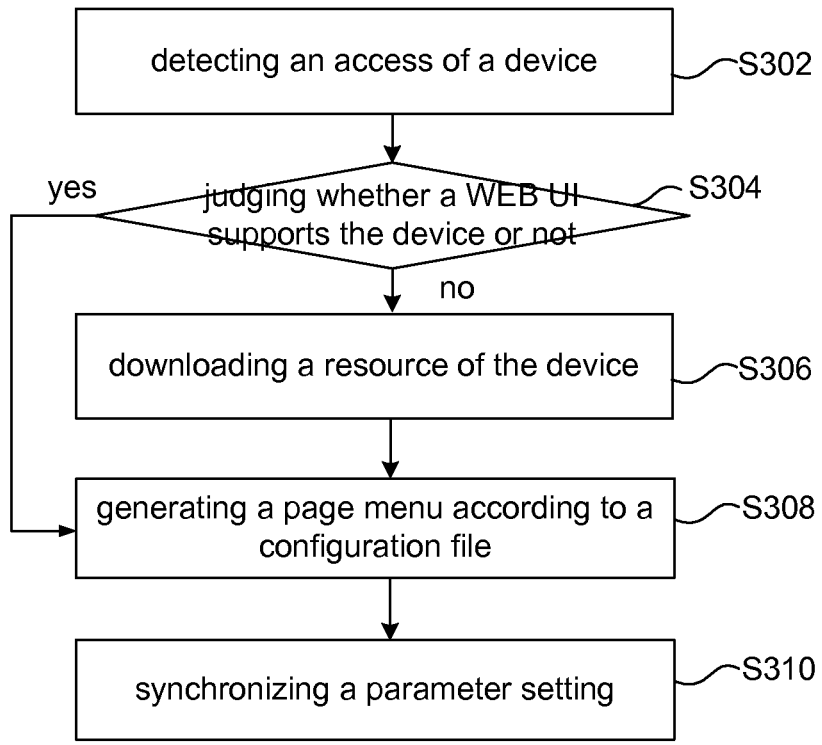
FIG. 3 is a first flowchart of a device management method according to a preferred embodiment of the disclosure.

FIG. 3 is a first flowchart of a device management method according to a preferred embodiment of the disclosure, in this embodiment a terminal may be for example a PC; as shown in FIG. 3, the method includes the following steps:

Step 302: detecting an access of a device.

A WEB UI is deployed on a PC side, and when the device is plugged into the PC, the PC detects the access of the device.

Step 304: judging whether the WEB UI supports the device or not.

The PC detects the type of the device through a universal Application Programming Interface (API) provided by a Web Server in the device, thereby confirming whether the current WEB UI supports the device or not. If yes, step 308 is executed, otherwise step 306 is executed.

Step 306: downloading a resource of the device.

If the PC detects that the current WEB UI does not support the device, a local Web Server of the PC initiates an acquiring resource request to the device to download an additional resource bundle required by the device, and stores the downloaded resource bundle to a deployment directory of the local Web Server.

Step 308: generating a page menu according to a configuration file.

When a browser of the PC opens the WEB UI, the configuration file corresponding to the device is found from the downloaded resource bundle or an existing resource bundle of the PC, and is loaded; and then the page menu is dynamically generated according to the configuration file and the resource bundle.

Step 310: synchronizing a parameter setting.

When a user clicks different menus of the WEB UI, a required resource on a page and a logic processing part are dynamically loaded. When the user sets a parameter of the device on the WEB UI, after the local Web Sever of the PC receives a synchronization request of the WEB UI, the local Web Sever forwards the synchronization request to the device to notify the device that the user has modified the parameter of the device. After the device receives the synchronization request, the corresponding parameter on the device side is modified and validated.

The device in the embodiment may be different types of terminal device, and when different device is plugged, the method is implemented according to the abovementioned steps, so that multiple different devices can be managed on a terminal side.

Embodiment 4

Figure 4:
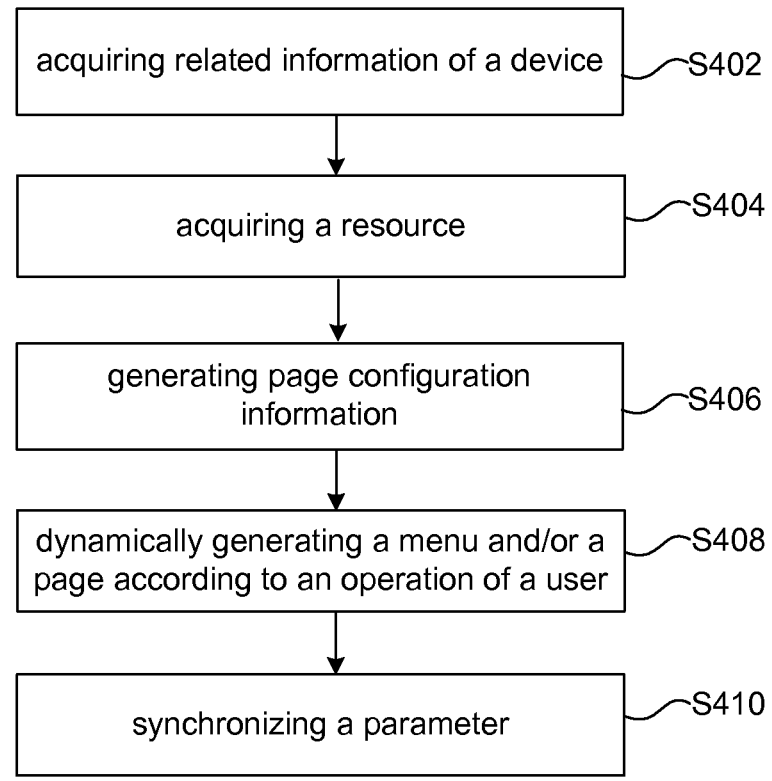
FIG. 4 is a second flowchart of a device management method according to a preferred embodiment of the disclosure.

FIG. 4 is a second flowchart of a device management method according to a preferred embodiment of the disclosure, as shown in FIG. 4, the method includes the following steps:

Step 402: acquiring related information of a device.

After the device accesses a terminal, the terminal performs detection according to the type of the device so as to acquire the related information of the device, such as a name and type of the device.

Step 404: acquiring a resource.

If detecting that the device is not supported, the terminal sends an acquiring resource request to the device to acquire the corresponding resource of the device, and stores the downloaded resource in a local Web Server so as to achieve the state of supporting the device. The resource includes the related information of the device, such as a configuration file.

If the terminal supports the device, the related resource of the device, such as the configuration file, has existed in the Web Server of the terminal, and is not required to be additionally downloaded.

Step 406: generating page configuration information.

The terminal obtains a path of the configuration file of the device according to the type of the device, loads the configuration file, and organizes a page according to information in the configuration file, such as menu configuration information and theme configuration information.

Step 408: generating a menu and/or a page dynamically according to an operation of a user.

After the WEB UI is opened, the menu is dynamically generated according to the menu configuration information obtained in Step 406, and when the user clicks different menus, a static page and a path of a JavaScript (JS) file are generated according to attributes of the menus, and are dynamically loaded, and after loading and data initialization, the page is presented to the user.

Step 410: synchronizing a parameter.

When the user sets a parameter on the WEB UI, after the local Web Server of the terminal receives a synchronization request from the WEB UI, the local Web Server forwards the synchronization request to the device to notify the device to synchronize the parameter setting, thereby validating the parameter setting. For example, the aim of forwarding the request can be fulfilled by modifying the configuration file of the Web Server and adding a forwarding rule, so that a local dynamic request can be forwarded to a Web Server in the device.

Embodiment 5

FIG. 5 is a third flowchart of a device management method according to a preferred embodiment of the disclosure, as shown in FIG. 5, the method includes the following steps:

Step 502: plugging a device by a user.

Step 504: detecting a type of the device.

After the user plugs the device into a terminal, a Web Server on a terminal side sends a query request to a Web Server of the device to check whether the terminal supports the device or not. If the device is not supported, step 506 is executed, otherwise, step 508 is executed.

Step 506: requesting to acquire a resource.

The Web Server on the terminal side sends an acquiring resource request to the device so as to acquire the resource required by the device.

Step 508: matching a configuration file.

The configuration file supporting the device is matched according to an existing resource on the terminal side or the downloaded resource.

Step 510: starting a WEB UI through a browser.

Step 512: generating an application menu.

After the user starts the WEB UI, the terminal dynamically generates the application menu according to the configuration file.

Step 514: setting a device parameter by the user.

The user sets the device parameter in the WEB UI.

Step 516: sending a synchronization request.

The Web Server on the terminal side sends the synchronization request to the Web Server on a device side, and sends a parameter setting to validate the parameter setting.

From the above, it can be seen that the embodiment of the disclosure achieves technical effects as follows: for the existing shortcomings of difficulty in multi-device management, huge maintenance cost of a developer, low customized response speed and the like, the WEB UI is removed from the device, is published to the terminal, and is automatically adapted to various kinds of device, so that different functions are realized for different device, the advantage of high usability of the WEB UI can further be utilized, convenience is brought to the user, the research, development and maintenance workload of a research and development person is also greatly reduced, cost can be lowered, and efficiency can be improved. Specifically, the embodiment of the disclosure achieves effects as follows: multiple devices can be simultaneously supported, so that convenience is brought to the use of the user; on-demand loading according to different functions is implemented, so that the performance of the browser is improved; different modules can be loaded according to needs, so that customized requirements can be rapidly met; and for device of a new type, a new configuration can be synchronized into the WEB UI of the terminal when the device is plugged to the terminal as long as own Web Server of the device provides a specific interface, and it is unnecessary to compile a content of the Web and install the WEB UI, so that the adaptability of the WEB UI is enhanced.

Obviously, those skilled in the art should know that each module or step of the embodiment of the disclosure can be implemented by a universal computing apparatus, and the modules or steps can be concentrated on a single computing apparatus or distributed on a network formed by a plurality of computing apparatuses, and can optionally be implemented by programmable codes executable for the computing apparatuses, so that the modules or steps can be stored in a storage apparatus for execution with the computing apparatuses, or can form each integrated circuit module, or multiple modules or steps therein can form a single integrated circuit module for implementation. As a consequence, the disclosure is not limited to any specific hardware and software combination.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

What is claimed is:

1. A device management method, comprising:
    detecting, by a terminal, an access of a device;
    acquiring, by the terminal, a type of the device;
    judging, by the terminal according to the type of the device, whether a user device management application WEB User Interface (WEB UI) of the terminal supports the device or not;
    searching, by the terminal, an existing resource of the terminal for a configuration file corresponding to the device under the condition that the WEB UI of the terminal supports the device;
    downloading, by the terminal, a resource supporting the device from the device and searching the downloaded resource for the configuration file corresponding to the device under the condition that the WEB UI of the terminal does not support the device; and
    generating, by the terminal, the WEB UI corresponding to the device according to the configuration file corresponding to the device.

2. The method according to claim 1, wherein the downloading the resource supporting the device from the device comprises:
    sending, by the terminal, an acquiring resource request to the device; and
    receiving, by the terminal, the resource sent in response to the request by the device, and storing the resource in its Web Server.

3. The method according to claim 1, further comprising:
    after the terminal generates the user device management application WEB UI corresponding to the device according to the configuration file corresponding to the device,
    when a user sets a parameter of the device in the WEB UI of the terminal, sending, by the terminal, a synchronization request to the device to notify the device to set the corresponding parameter.

4. The method according to claim 1, further comprising:
    after the terminal generates the user device management application WEB UI corresponding to the device according to the configuration file corresponding to the device,
    dynamically loading, by the terminal, a required resource on a page and a logic processing part according to an operation of a user and the configuration file, and generating a corresponding page menu.

5. The method according to claim 2, further comprising:
    after the terminal generates the user device management application WEB UI corresponding to the device according to the configuration file corresponding to the device,
    when a user sets a parameter of the device in the WEB UI of the terminal, sending, by the terminal, a synchronization request to the device to notify the device to set the corresponding parameter.

6. The method according to claim 2, further comprising:
    after the terminal generates the user device management application WEB UI corresponding to the device according to the configuration file corresponding to the device,
    dynamically loading, by the terminal, a required resource on a page and a logic processing part according to an operation of a user and the configuration file, and generating a corresponding page menu.

7. The method according to claim 1, wherein the configuration file comprises at least one of menu configuration information and theme configuration information.

8. A device management apparatus, which is implemented in a terminal, comprising:
    a processor; and
    a memory for storing instructions executable by the processor,
    wherein the processor is configured to:
    detect an access of a device;
    acquire a type of the device;
    judging, according to the type of the device, whether a user device management application WEB User Interface (WEB UI) of the terminal supports the device or not;
    search an existing resource of the terminal for a configuration file corresponding to the device under the condition that the WEB UI of the terminal supports the device;
    download a resource supporting the device from the device and search the downloaded resource for the configuration file corresponding to the device under the condition that the WEB UI of a terminal does not support the device
    generate the WEB UI corresponding to the device according to the configuration file corresponding to the device.

9. The apparatus according to claim 8, the processor is further configured to:
    send an acquiring resource request to the device, and to store a resource in its Web Server when receiving the resource sent in response to the request by the device.

10. The apparatus according to claim 8, wherein the configuration file comprises at least one of menu configuration information and theme configuration information.

\* \* \* \* \*